United States Patent
Shuaib et al.

(10) Patent No.: US 10,502,094 B2
(45) Date of Patent: Dec. 10, 2019

(54) BEARING COMPARTMENT SEALING SYSTEM WITH PASSIVE COOLING

(71) Applicant: UNITED TECHNOLOGIES CORPORATION, Farmington, CT (US)

(72) Inventors: Nasr A. Shuaib, Watertown, MA (US); Jonathan L. Miller, Ware, MA (US); M. Rifat Ullah, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 268 days.

(21) Appl. No.: 14/803,452

(22) Filed: Jul. 20, 2015

(65) Prior Publication Data
US 2016/0032765 A1    Feb. 4, 2016

Related U.S. Application Data

(60) Provisional application No. 62/027,699, filed on Jul. 22, 2014.

(51) Int. Cl.
*F01D 25/12* (2006.01)
*F01D 11/00* (2006.01)
(Continued)

(52) U.S. Cl.
CPC .......... *F01D 25/125* (2013.01); *F01D 11/003* (2013.01); *F01D 11/02* (2013.01); *F01D 25/183* (2013.01); *F16C 33/6637* (2013.01); *F16C 33/7896* (2013.01); *F16C 33/805* (2013.01); *F16J 15/164* (2013.01); *F16J 15/442* (2013.01); *F05D 2220/32* (2013.01); *F05D 2240/55* (2013.01); *F05D 2260/20* (2013.01);
(Continued)

(58) Field of Classification Search
CPC .......... F16J 10/04; F16J 15/3484; F16J 15/442
See application file for complete search history.

(56) References Cited

U.S. PATENT DOCUMENTS 2,956,824 A * 10/1960 Kuchler ................. F01D 11/003
   277/500
3,836,216 A *  9/1974 Junker .................. F01D 11/003
   277/580

(Continued)

OTHER PUBLICATIONS

European Search Report for Application No. 15 17 7838 dated Nov. 27, 2015.

*Primary Examiner* — Kristina R Fulton
*Assistant Examiner* — L. Susmitha Koneru
(74) *Attorney, Agent, or Firm* — Cantor Colburn LLP

(57) ABSTRACT

The present disclosure relates to sealing systems for bearing compartments. In one embodiment, a sealing system includes a runner configured to extend circumferentially around a rotating component, the runner is formed of a material with low radial thermal growth and is configured to fit to the rotating component to remove heat away from the runner. The runner can include an outer surface configured to provide passive cooling for the runner in the bearing compartment. The sealing system can also include a seal configured to operate with the runner, wherein the seal includes a clearance seal on an air side of the runner. The runner can be configured to operate without direct oil cooling.

19 Claims, 6 Drawing Sheets

(51) Int. Cl.

| | | |
|---|---|---|
| *F01D 25/18* | (2006.01) | |
| *F16J 15/44* | (2006.01) | |
| *F01D 11/02* | (2006.01) | |
| *F16C 33/66* | (2006.01) | |
| *F16C 33/78* | (2006.01) | |
| *F16C 33/80* | (2006.01) | |
| *F16J 15/16* | (2006.01) | |
| *F16C 19/06* | (2006.01) | |

(52) U.S. Cl.
CPC .... *F05D 2260/98* (2013.01); *F05D 2300/175* (2013.01); *F05D 2300/5021* (2013.01); *F16C 19/06* (2013.01); *F16C 2360/23* (2013.01)

(56) References Cited

U.S. PATENT DOCUMENTS

| | | | |
|---|---|---|---|
| 3,997,805 A * | 12/1976 | Dochterman | F16C 33/76 |
| | | | 277/391 |
| 5,451,066 A * | 9/1995 | Totain | F16J 15/406 |
| | | | 277/347 |
| 5,813,830 A * | 9/1998 | Smith | F16J 15/442 |
| | | | 277/349 |
| 8,641,336 B1 | 2/2014 | Ullah et al. | |
| 9,567,908 B2 * | 2/2017 | Bordne | F02C 7/06 |
| 2002/0074730 A1 * | 6/2002 | Mayer | F16J 15/3288 |
| | | | 277/355 |
| 2006/0239816 A1 * | 10/2006 | Labbe | F01D 11/003 |
| | | | 415/230 |
| 2007/0025835 A1 * | 2/2007 | Gockel | F01D 25/125 |
| | | | 415/110 |
| 2011/0304101 A1 * | 12/2011 | Grondahl | F01D 11/02 |
| | | | 277/411 |
| 2013/0283757 A1 * | 10/2013 | Bordne | F01D 25/125 |
| | | | 60/39.08 |
| 2014/0099188 A1 * | 4/2014 | Bordne | F01D 25/18 |
| | | | 415/112 |

\* cited by examiner

BEARING COMPARTMENT SEALING SYSTEM WITH PASSIVE COOLING

CROSS-REFERENCE TO RELATED APPLICATIONS

This Application claims priority to U.S. Provisional Application No. 62/027,699 filed Jul. 22, 2014 and titled BEARING COMPARTMENT SEALING SYSTEM WITH PASSIVE COOLING, the disclosure of which is incorporated herein by reference in its entirety.

GOVERNMENT LICENSE RIGHTS

The present disclosure was made with government support under a contract awarded by the United States Army. The government has certain rights in this disclosure.

FIELD

The present disclosure relates to seals for a gas turbine engine and, more particularly, to sealing systems including a runner.

BACKGROUND

Seal systems with circumferential elements are often used in the high temperature environment of gas turbine engines where a rotational structure extends through stationary structures, for example, to seal mainshaft bearing compartments. Conventional methods and systems can employ a direct oil jet to cool circumferential sealing elements. The conventional direct jet oil directs oil into the under side of a bore side of a runner for cooling such that the direct oil supply is used to cool the runner and pull heat away from contacting surfaces of the runner.

There is a need in the art for seal systems that do not rely on direct oil cooling of a runner.

BRIEF SUMMARY OF THE EMBODIMENTS

Disclosed and claimed herein are runner assemblies for circumferential seal assemblies.

One embodiment is directed to a sealing system for a bearing compartment, the sealing system including a runner configured to extend circumferentially around a rotating component, wherein the runner is formed of a material with low radial thermal growth, wherein the runner is configured to fit to the rotating component to remove heat away from the runner and wherein the runner includes an outer surface configured to provide passive cooling for the runner in the bearing compartment. The sealing system also includes a seal configured to operate with the runner, wherein the seal includes a clearance seal on an air side of the runner.

In one embodiment, the runner is substantially cylindrical with a hollow core configured for the rotating component.

In one embodiment, the material of the runner includes a nickel alloy.

In one embodiment, the runner is configured to be fit to the rotating shaft by an interference fit.

In one embodiment, the outer surface of the runner extends into the bearing compartment a distance in order to receive passive oil to cool the runner.

In one embodiment, the runner is configured to operate without direct oil cooling.

In one embodiment, the runner includes a substantially rectangular cut-out along an inner surface of the runner, wherein the width of the cut-out is dimensioned to maximize heat conduction away from the seal.

In one embodiment, the clearance seal is a stationary arch bound seal.

In one embodiment, the seal includes the one or more seal segments that form a segmented carbon seal for a bearing compartment of a gas turbine engine.

In one embodiment, the runner is configured to operate with a stator assembly including a contacting seal for an oil side and a clearance arch bound seal for an air side.

Another embodiment is directed to a sealing system for a bearing compartment of a gas turbine engine, the sealing system including a runner configured to extend circumferentially around a rotating component, wherein the runner is formed of a material with low radial thermal growth, wherein the runner is configured to fit to the rotating component to remove heat away from the runner and wherein the runner includes an outer surface configured to provide passive cooling for the runner in the bearing compartment. The sealing system including a seal configured to operate with the runner, wherein the seal includes a clearance seal on an air side of the runner, and wherein the runner is configured to operate without direct oil cooling.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
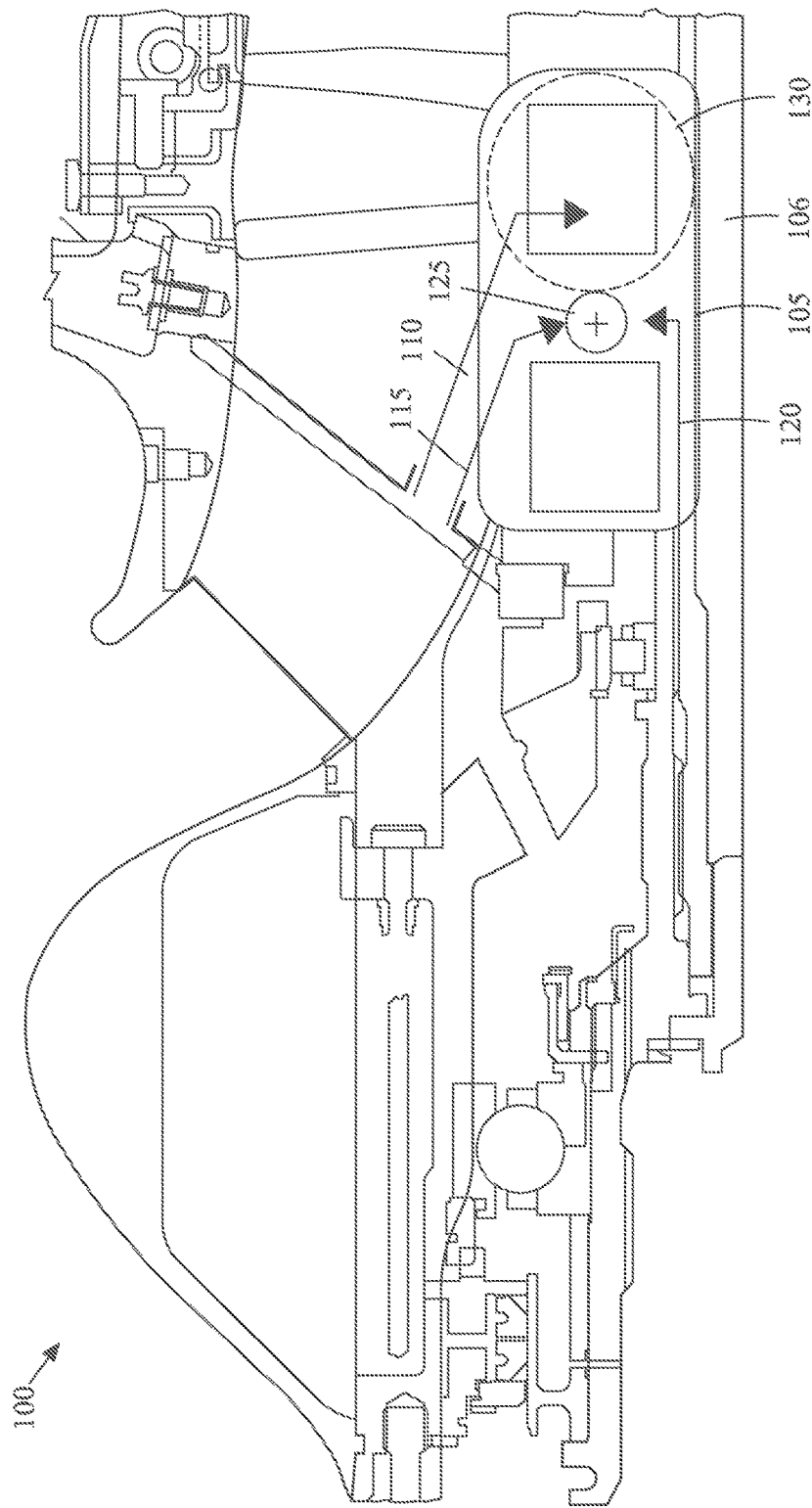
FIG. 1 depicts a simplified cross-sectional representation of a turbine engine according to one or more embodiments.

One aspect of the disclosure relates to a seal system including a runner One embodiment is directed to a sealing system configured to seal oil in a hearing compartment. Bearing compartments need lubrication for cooling and lubricity. Thus, lubrication with oil can provide a number of factors, including removing heat and to provide lubricity. According to the embodiments discussed herein, a seal system is provided to allow for passive cooling, such as passive cooling of the runner assembly without direct oil cooling (e.g., 0.0 pounds-per-minute (ppm) cooling). The seal system may be configured to allow for packaging seals in tight spaces relative to seal systems which require direct oil jets.

In one embodiment, the sealing system includes a rotating member or "runner" that interoperates with a stationary seal made of one or more carbon elements retained in a stationary housing. The stationary seal may include two carbon ring elements—one on the oil side of the bearing compartment and another (e.g., a clearance seal) on the air side of the bearing compartment, such that sealing is provided across mating surfaces that have radial orientation. Thus, a radial seal is provided. In certain embodiments, a sealing system is provided including stationary carbon seals that are circumferentially segmented. A runner may be provided with a cylindrical configuration. In certain embodiments, a carbon seal on an air side is preferred to be of a clearance seal. A clearance seal may relate to one of a non-contacting type seal, fully arch bound seal and seal in general that starts as a contact seal which wears into a non-contacting seal. Non-contacting type seals refer to seals where there is a small gap between the seal and the runner; therefore, the seal does not rub on the runner, and thus, generates very little heat, This type of a non-contacting circumferentially segmented carbon seal is typically referred to as an "archbound" seal. Embodiments described herein discuss an arch-bound seal within a sealing system having a runner configured to operate without a direct oil jet to the runner.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a cross-sectional representation of a gas turbine engine 100 according to one or more embodiments. The gas turbine engine 100 includes a bearing compartment, generally shown as 105, having circumferential seal and runner according to one or more embodiments. Bearing compartment 105 is shown with respect to shaft 106 and air supply 110 and cooling oil 115 and 120. Bearing compartment 105 may be configured to support a shaft 106 of turbine engine 100 with one or more bearings, such as bearing 125.

In one embodiment, a sealing system is provided for turbine engine 100. Exemplary embodiments of the sealing system are shown in FIGS. 2A-2D. According to one embodiment, a sealing system, shown generally as 130, is provided including a seal which does not require direct oil cooling (e.g., a dedicated oil jet) for the runner and/or seal portion of the bearing compartment. Sealing system 130 may be configured for one or more of reduced heat generation, reduced thermal growth, improved heat transfer and/or to allow for passive oil cooling. Passive oil cooling may allow for a sealing assembly to operate without direct oil cooling. Unlike direct oil cooling, passive oil cooling allows for oil mist, for example, from cooling oil 115 and/or 120 to indirectly cool a runner. Oil mist can relate to oil which may be in bearing compartment 105.

The gas turbine engine 100 generally incorporates a fan section, a compressor section, a combustor section and a turbine section among other systems or features. Although FIG. 1 is depicted as a gas turbine engine, it should be understood that the concepts described herein are not limited to use with as turbine engines as the teachings may be applied to other types of engines or sealing systems in general.

Figure 2A:
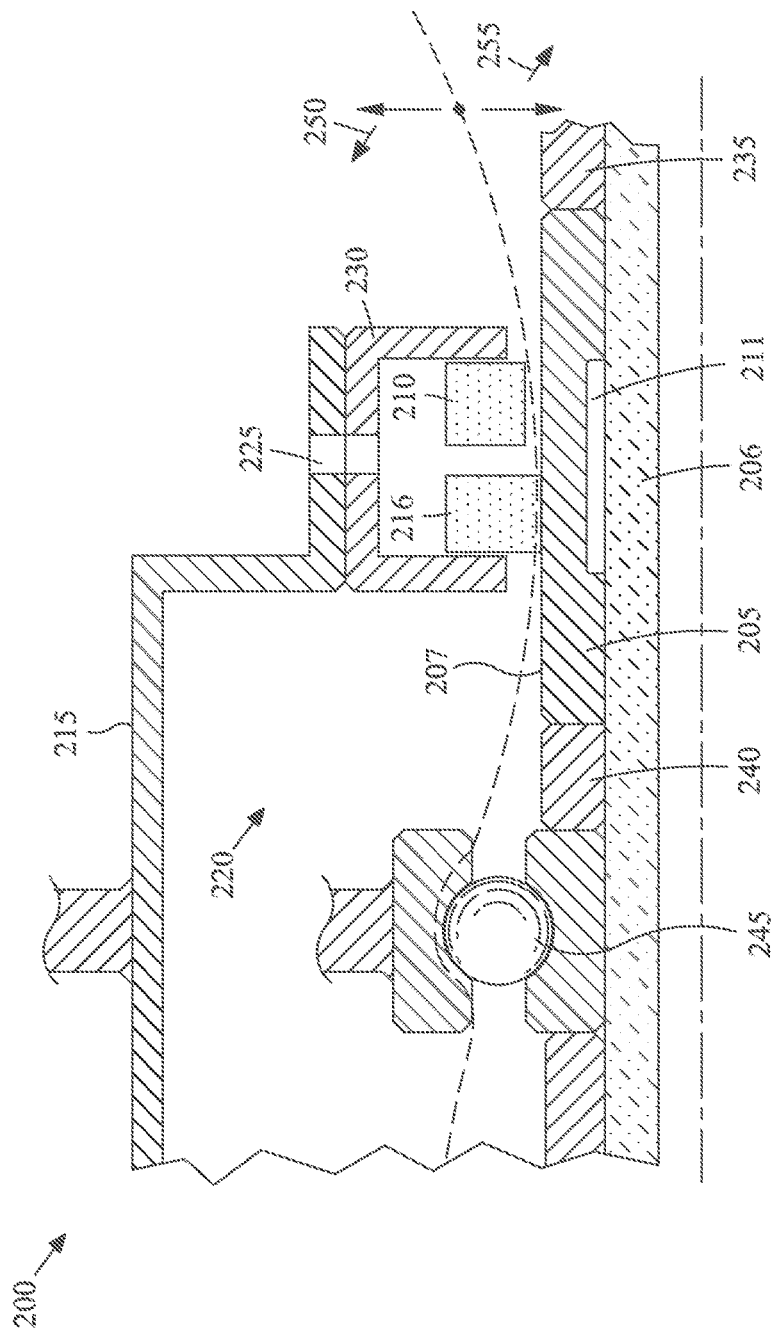
FIGS. 2A-2D depict cross-sectional representations sealing systems according to one or more embodiments.

FIGS. 2A-2D depict cross-sectional representations of bearing compartments including sealing systems according to one or more embodiments. FIG. 2A depicts sealing system 200 including runner 205 and seals 210 and 216. Sealing system 200 is shown relative to bearing compartment 215, which may be a bearing compartment of a as turbine engine (e.g., bearing compartment 105 of FIG. 1). It should be appreciated that sealing system 200 may be configured for one or more types of bearing compartment, or gas turbine engine.

According to one embodiment, sealing system 200 may be a circumferential sealing system having a stationary (e.g., non-rotating) assembly, such as seal 210, mounted to the static structure, such as structure 230, of bearing compartment 215 and a runner 205 mounted to a rotating component, such as one or more engine shafts represented as 206.

Sealing system 200 may be configured to ensure that engine shaft(s) 206 are sealed at several points to prevent unwanted fluid leakage between, for example, engine compartments. Sealing system 200 may be configured for sealing a main shaft bearing compartment where, for example, separation is required for bearing lubrication oil in the bearing compartment from air side pressure.

Runner 205 may be a circumferential runner for a circumferential seal assembly, such as sealing system 200. Runner 205 may be configured to extend circumferentially around a rotating component, such as shaft 206, such that at least a portion of the inward facing surface of runner 205 meets with shaft 206. According to one embodiment, runner 205 is substantially cylindrical with a hollow core, the core configured for a tight (e.g., interference) fit with shaft 206. Runner 205 is configured to fit to a rotating component, such as shaft 206, to remove heat away from the runner 205. Runner 205 includes an outer surface 207 configured to provide passive cooling for the runner in bearing compartment 215. By way of example, surface 207 is an outward facing surface of runner 205 which extends into bearing compartment 215 towards bearing 245, such that surface 207 provides surface area for passive oil cooling exposure. The particular distance surface 207 extends into bearing compartment 215 may be based on the particular turbine, the particular engine, heat of the shaft, heat characteristics of the runner, etc. However, it should be appreciated that the outer surface 207 may be configured to intentionally protrude to expose runner 205 to oil mist 220 within bearing compartment 215 in order to enhance convective heat transfer. In certain embodiments, the amount outer surface 207 extends may be maximized based on available space within the bearing compartment 215.

In certain embodiments, runner 205 may include a substantially rectangular cut-out 211 along an inner surface of the runner, wherein the width of the cut-out is arranged or dimensioned to maximize the heat conduction away from seal components 210 and 216 of the seal system.

According to another embodiment, runner 205 is formed of a material with low radial thermal growth, such as a material including a nickel alloy. One benefit of employing a nickel alloy is a coefficient of thermal expansion that it is very close to that of structural carbon. As a result, the carbon seal and the runner expand at nearly the same rate during operation. This has dual benefits: (a) The contacting oil seal 216 generates less heat as the contact pressure is lower; and (b) The non-contacting arch-bound seal 210 can be designed with the lowest possible leakage air gap which minimizes air leakage (i.e., improves fuel consumption since costly buffer air is not wasted.)

Runner 205 is configured to operate without direct oil cooling. By way of example, bearing compartment may provide a certain amount of oil mist in the bearing compartment as the bearing itself will require oil for cooling. Cooling by means of a fluid, such as oil, removes the heat by convective heat transfer. Convective cooling for runner 205 may be provided by ambient oil mist within the bearing compartment. Unlike a direct oil jet, ambient oil mist may result from oil that is applied to components in the bearing compartment, but does not require a particular jet or directed application of a jet. An ambient mist may range from a molecule of lubricant to a full direct spray. The volume of ambient mist depends on the compartment and may be relative to the amount of oil for the compartment. The mist is droplets of oil naturally generated in a bearing compartment, such as droplets of oil floating in the ambient air, such that air flow inside the bearing compartment atomizers the oil and creates a mist.

Sealing system 200 includes seal elements 216 and 210 configured to operate with runner 205. Seal elements 216 and 210 may be a dual element carbon seal. Seal 210 may be a carbon seal on the "air side" of the dual element carbon seal (e.g., since there is dry air on all sides of this seal). Seal 210 can be configured with an "arch-bound" configuration, such that seal 210 is a non-contacting seal, as there is a small gap between this seal and the runner 205. Since the seal 210 does not rub on the runner 205, very little heat is generated by seal 210.

Seal 216 is on the "oil side" of a dual element carbon seal (e.g., since there is oil on one side (compartment) and dry air (no oil) on the other side of this seal). Seal 216 runs in rubbing contact with runner 205, and hence is a "contacting seat." According to one embodiment, seal 216 runs in contacting mode to reduce the chances of oil leaking out of bearing compartment 215. The contact with seal 216 generates heat which can be removed by one or more features of sealing system 200.

Runner 205 is configured to operate with a stator assembly including a contacting seal 216 for an oil side and a clearance arch bound seal 210 for an air side of the runner/seal. Sealing system 200 may be configured to reduce and/or distribute heat generated by rotation of shaft 206 within bearing compartment 215. By towering the thermal distress of sealing system 200, operation may be allowed without direct cooling oil flow. Sealing system 200 does not require direct oil cooling with a dedicated oil jet for runner 205.

Seal elements 216 and 210 may include one or more carbon sealing components which can engage with an outer radial surface of runner 205 to control fluid leakage there between. Airside arch bound seal 210 may be mounted in a radial plane to provide an air side seal and may be configured to reduce heat generated by sealing system 200.

Static structure 230 may relate to a retainer assembly manufactured from metallic material. According to one embodiment, seating system 200 is configured to interface with static structure 230 to increase heat transfer from the sealing system 200 to engine shaft 206 and/or to air or oil for the sealing structure. Runner 205 may be configured relative to the seal element 210 to provide a constant gap there between throughout the entire operating envelope of the engine compartment. Static structure 230 may also include holes, such as hole 225, for admitting pressurized air (also known as "buffer air") to aide in sealing.

In certain embodiments, runner 205 may be positioned between shoulder 235, which abuts stacked components such as the runner 205 and bearing 245, and spacer 240. In certain embodiments, bearing 245 can be any type of rolling element bearing that requires lubricating oil, hence the need for the compartment seals. For purposes of illustration, the stationary portion of the bearing system is shown as 250 and the rotation portion is denoted by 255 in FIG. 2A. Seal system 200 is shown as a partial representation in FIG. 2A.

Figure 2B:
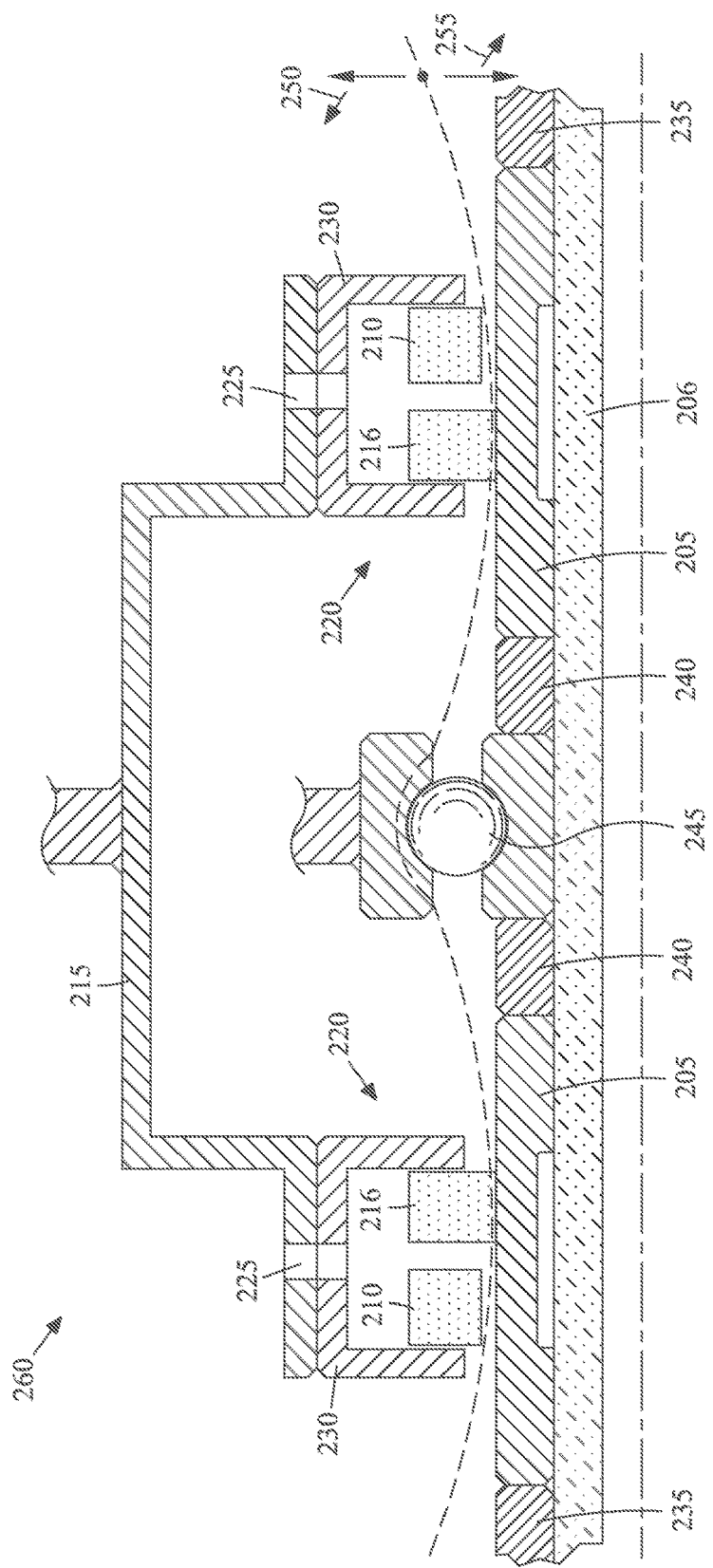
Figure 2C:
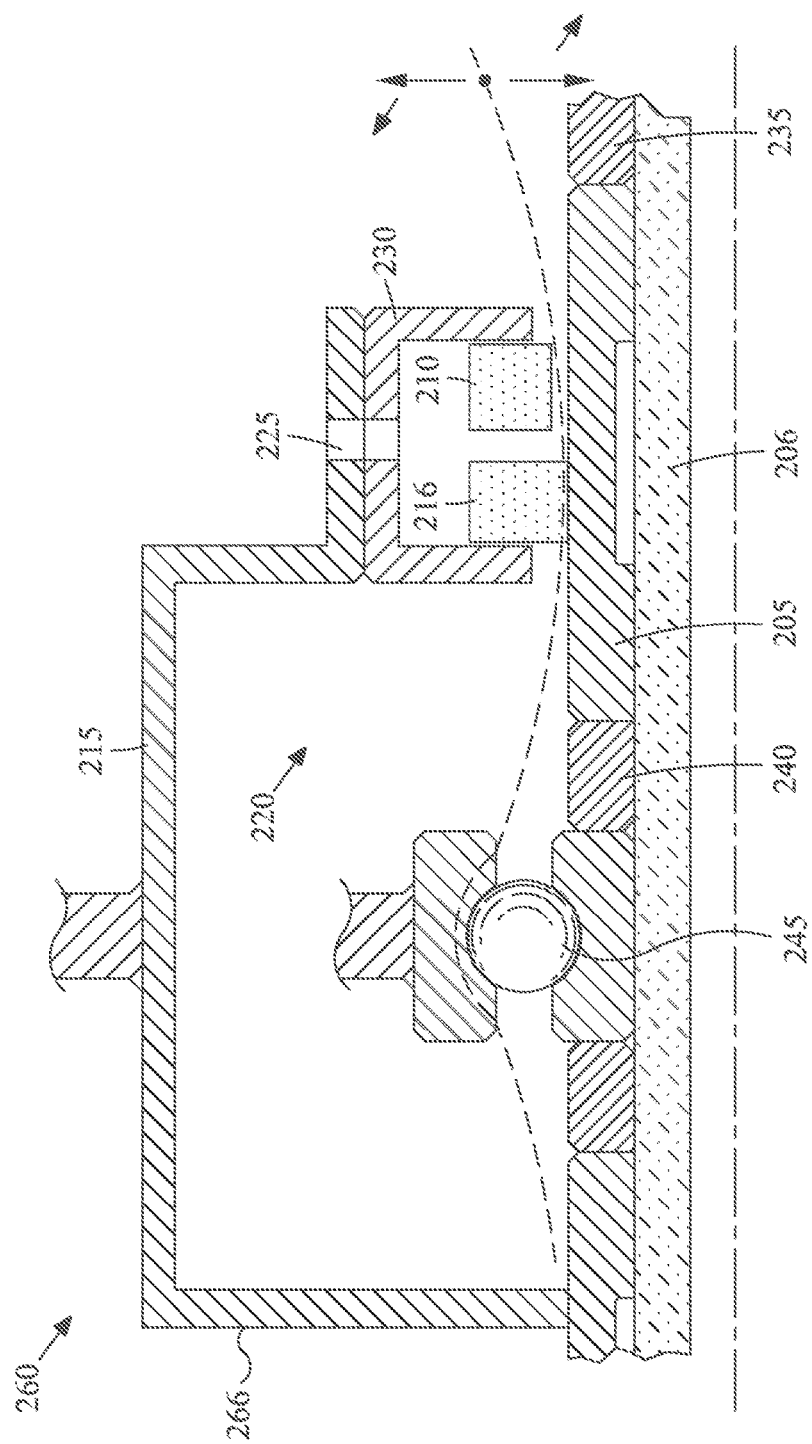

Referring now to FIG. 2B, the sealing system of FIG. 2A is shown according to another embodiment. In system 260 of FIG. 2B, a bearing compartment 215 is provided with sealing system for each side of bearing 245. FIG. 2C depicts an arrangement for a bearing compartment 215 according to another embodiment including a sealing system of runner 205 on one side of bearing 245, with wall 266 closed off on the other side of bearing 245. Cooling oil 115 is provided to bearing 245 by a typical engine lubrication system.

Figure 2D:
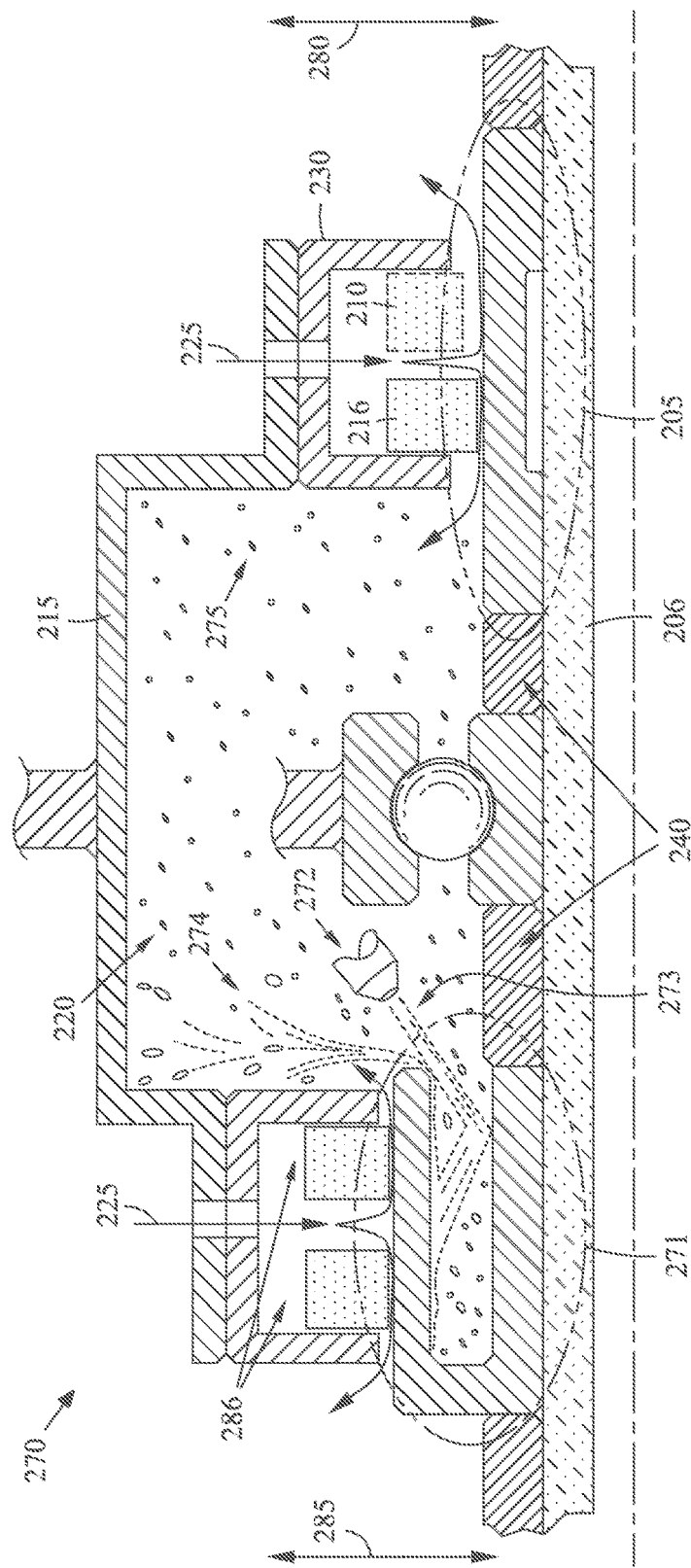

Referring now to FIG. 2D, the sealing system of FIG. 2A is shown according to another embodiment. FIG. 2D depicts an arrangement 270 for a bearing compartment 215 according to another embodiment including a sealing system of runner 205 on one side of bearing 245, with runner 271 on the other side of bearing 245. Runner 271 may be an annual runner, different from the runner 205, such that runner 271 requires oil nozzle 272 to supply a direct oil jet 273. Direct oil jet 273 may produce spray 274 which can result in oil mist (e.g., ambient oil) 275 within the bearing compartment 215. Runner 205 does not require a direct jet and also allows for a reduced outer diameter 280 in comparison with that or runner 271, shown as 285. In addition, runner 271 uses two contacting seals, shown as 286. Because runner 205 does not need to capture the direct oil jet, its form factor is improved (e.g., low profile). Thus, a carbon seal design that can be packaged in a much smaller space.

Figure 3A:
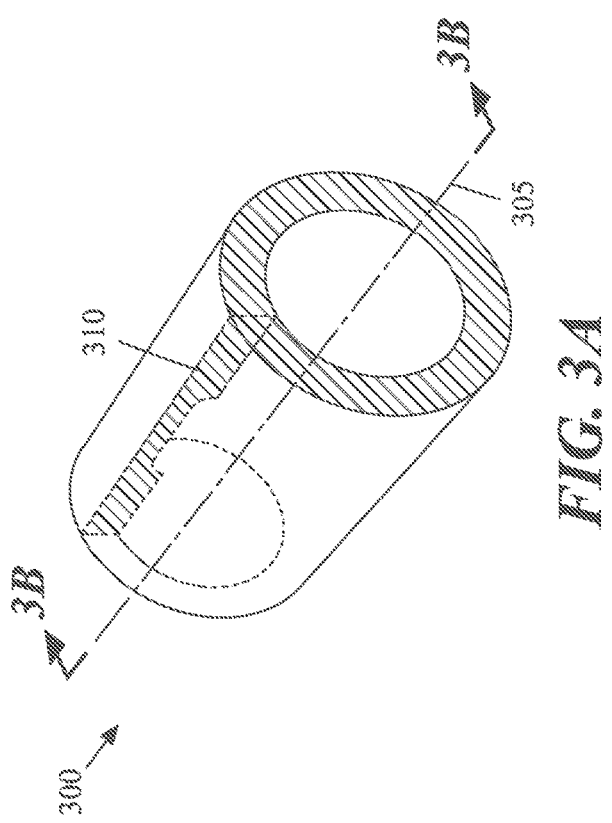
FIGS. 3A-3B depict graphical representations of a runner according to one or more embodiments.
Figure 3B:
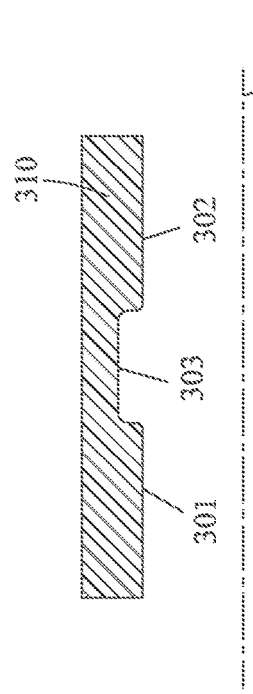

FIGS. 3A-3B depict a graphical representation of a runner according to one or more embodiments. A simplified representation is depicted of runner 300 relative to center axis 305. As shown in FIG. 3A, runner 300 is substantially cylindrical with a hollow core configured for a rotating component. FIG. 3B depicts a cross-sectional representation runner 300 relative to center axis 305. Runner 300 is depicted as having a cross section 310 including forward portion 301 and rearward portion 302. Section 310 of the runner is typically in tight fit with the inboard engine main-shaft. This tight fitting interface improves heat conduction and helps dissipate the heat generated by the rubbing contact with the oil side seal. The removal of the heat in this manner is by the mode of conductive heat transfer where the heat flows from hotter to cooler parts in the conduction path.

Runner 300 includes a material cut-out 303 on the non-sealing side of the runner 300. Cut-out 303 is a substantially rectangular cut-out along an inner surface of the runner, wherein the width of the cut-out is dimensioned or sized to maximize the heat conduction away from the seal. Cut-out 303 works along with features 301 and 302 to maximize the heat conduction depending on whether the runner 300 is warmer or cooler than an inboard shaft. If the runner 205 is warmer than the shaft 206 then the width of 301 and 302 may be maximized and the cut-out 303 width may be minimized or even eliminated. Conversely, if the runner 205 is cooler than the shaft 206 then 301 and 302 may be minimized and 303 may be maximized.

Figure 4:
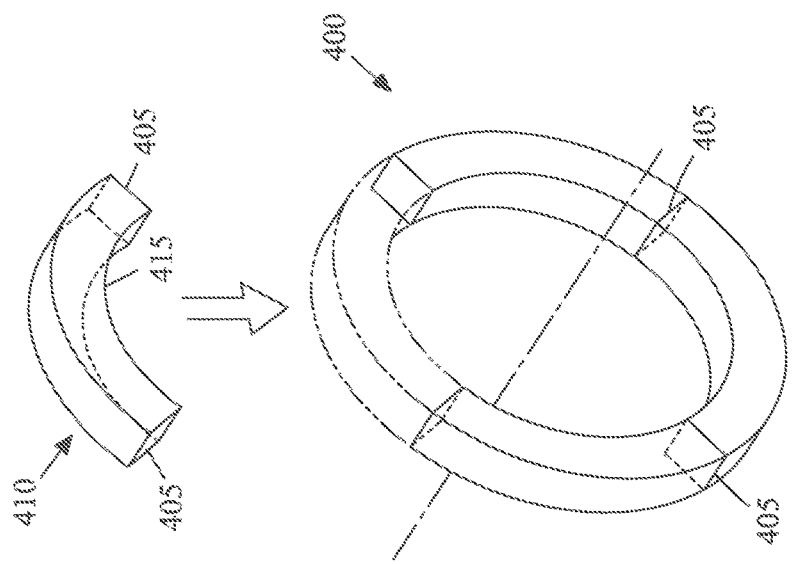
FIG. 4 depicts a graphical representation of a seal according to one or more embodiments.

FIG. 4 depicts a graphical representation of a seal element, such as a carbon sealing ring 400 according to one or more embodiments. Carbon sealing ring 400 includes one or more seal segments that form a segmented carbon seal for a bearing compartment of a gas turbine engine. An isometric view of carbon sealing ring 400 is depicted as of circumferentially segmented carbon seal, with joints 405 between carbon seal segments. Carbon sealing ring 400 may include a plurality of seal segments, such as 410. The downward facing curved surface 415 of the seal 410 forms the sealing surface together with a runner (e.g., runner 205).

While this disclosure has been particularly shown and described with references to exemplary embodiments thereof, it will be understood by those skilled in the art that various changes in form and details may be made therein without departing from the scope of the claimed embodiments.

What is claimed is:

1. A sealing system for a bearing compartment comprising:
    a runner configured to extend circumferentially around a rotating component, wherein the runner is formed of a material with low radial thermal growth, wherein the runner is configured to fit to the rotating component to remove heat away from the runner and wherein the runner includes an outer surface configured to provide passive cooling for the runner in the bearing compartment;
    a static structure located radially outboard of the runner defining a sealing compartment, the static structure including:
        a retainer assembly;
        a first carbon seal element disposed in the retainer assembly on an oil side of the sealing compartment and radially outboard of the seal runner, the first carbon seal element configured for contact with the seal runner to prevent oil leakage from the bearing compartment;
        a second carbon seal element disposed in the retainer assembly on an air side of the sealing compartment and radially outboard of the seal runner, the second carbon seal element configured for non-contact with the seal runner along an entire axial extent of the second carbon seal element; and
        one or more openings in the retainer assembly to admit a flow of buffer air to pressurize the sealing compartment, the one or more openings configured to admit the flow of buffer air into the sealing compartment at a location radially outboard of a radial extent of the first carbon seal element and the second carbon seal element.

2. The sealing system of claim 1, wherein the runner is substantially cylindrical with a hollow core configured for the rotating component.

3. The sealing system of claim 1, wherein the material of the runner includes a nickel alloy.

4. The sealing system of claim 1, wherein the runner is configured to be fit to the rotating shaft by an interference fit.

5. The sealing system of claim 1, wherein the outer surface of the runner extends into the bearing compartment a distance in order to receive passive oil to cool the runner.

6. The sealing system of claim 1, wherein the runner is configured to operate without direct oil cooling.

7. The sealing system of claim 1, wherein the runner includes a substantially rectangular cut-out along an inner surface of the runner, wherein the width of the cut-out is dimensioned to maximize heat conduction away from the seal and the runner.

8. The sealing system of claim 1, wherein the second carbon seal element is a stationary arch bound seal.

9. The sealing system of claim 1, wherein the seal includes the one or more seal segments that form a segmented carbon seal for a bearing compartment of a gas turbine engine.

10. The sealing system of claim 1, wherein the runner is configured to operate with a stator assembly including a contacting seal for an oil side and a clearance arch bound seal for an air side.

11. A sealing system for a bearing compartment of a gas turbine engine, the sealing system comprising:
    a runner configured to extend circumferentially around a rotating component, wherein the runner is formed of a material with low radial thermal growth, wherein the runner is configured to fit to the rotating component to remove heat away from the runner and wherein the runner includes an outer surface configured to provide passive cooling for the runner in the bearing compartment;
    a static structure located radially outboard of the runner defining a sealing compartment, the static structure including:
        a retainer assembly;
        a first carbon seal element disposed in the retainer assembly on an oil side of the sealing compartment and radially outboard of the seal runner, the first carbon seal element configured for contact with the seal runner to prevent oil leakage from the bearing compartment;
        a second carbon seal element disposed in the retainer assembly on an air side of the sealing compartment and radially outboard of the seal runner, the second carbon seal element configured for non-contact with the seal runner along an entire axial extent of the second carbon seal element; and
        one or more openings in the retainer assembly to admit a flow of buffer air to pressurize the sealing compartment, the one or more openings configured to admit the flow of buffer air into the sealing compartment at a location radially outboard of a radial extent of the first carbon seal element and the second carbon seal element;
    wherein the runner is configured to operate without direct oil cooling.

12. The sealing system of claim 11, wherein the runner is substantially cylindrical with a hollow core configured for the rotating component.

13. The sealing system of claim 11, wherein the material of the runner includes a nickel alloy.

14. The sealing system of claim 11, wherein the runner is configured to be fit to the rotating shaft by an interference fit.

15. The sealing system of claim 11, wherein the outer surface of the runner extends into the bearing compartment a distance in order to receive passive oil to cool the runner.

16. The sealing system of claim 11, wherein the runner includes a substantially rectangular cut-out along an inner surface of the runner, wherein the width of the cut-out is dimensioned to maximize heat conduction away from the seal.

17. The sealing system of claim 11, wherein the second carbon seal element is an arch bound seal.

18. The sealing system of claim 11, wherein the seal includes the one or more seal segments that form a segmented carbon seal for a bearing compartment of a gas turbine engine.

19. The sealing system of claim 11, wherein the runner is configured to operate with a stator assembly including a contacting seal for an oil side and a clearance arch bound seal for an air side.

* * * * *